United States Patent
Prud'Homme Lacroix et al.

(10) Patent No.: US 11,035,426 B2
(45) Date of Patent: Jun. 15, 2021

(54) CALIPER BRAKING SYSTEM FOR AIRCRAFT LANDING GEAR HAVING A PLURALITY OF BRAKE DISK CLAMPING ZONES

(71) Applicant: AIRBUS HELICOPTERS, Marignane (FR)

(72) Inventors: Pierre Prud'Homme Lacroix, Vitrolles (FR); Olivier Bistuer, La Fare les Oliviers (FR)

(73) Assignee: AIRBUS HELICOPTERS, Marignane (FR)

( * ) Notice: Subject to any disclaimer, the term of this patent is extended or adjusted under 35 U.S.C. 154(b) by 10 days.

(21) Appl. No.: 16/435,941

(22) Filed: Jun. 10, 2019

(65) Prior Publication Data
US 2020/0032866 A1    Jan. 30, 2020

(30) Foreign Application Priority Data
Jun. 12, 2018 (FR) .................................... 1800600

(51) Int. Cl.
*F16D 65/12*    (2006.01)
*B64C 25/44*    (2006.01)
*F16D 65/00*    (2006.01)

(52) U.S. Cl.
CPC ............ *F16D 65/121* (2013.01); *B64C 25/44* (2013.01); *F16D 65/0075* (2013.01); *F16D 65/123* (2013.01)

(58) Field of Classification Search
CPC ............ F16D 2125/40; F16D 55/2255; F16D 55/224; F16D 65/092; F16D 2121/24;
(Continued)

(56) References Cited

U.S. PATENT DOCUMENTS 2,009,703 A * 7/1935 Pecker .................. B64C 27/021
                                                      188/71.5
2,586,518 A * 2/1952 Collier .................... F16D 55/31
                                                      188/72.3
(Continued)

FOREIGN PATENT DOCUMENTS

DE     102014107360 A1 *  5/2015  ............. F16D 55/24
EP         3181935 A1      6/2017
(Continued)

OTHER PUBLICATIONS

French Search Report for French Application No. FR 1800600, Completed by the French Patent Office, dated Feb. 13, 2019, 6 pages.

*Primary Examiner* — Bradley T King
*Assistant Examiner* — Mahbubur Rashid
(74) *Attorney, Agent, or Firm* — Brooks Kushman P.C.

(57) ABSTRACT

A braking system for aircraft landing gear including a plurality of clamping zones for clamping a brake disk. The braking system comprises an actuator, a caliper, a rim rotatable about an axis of rotation, and the brake disk, which is floatingly mounted relative to the rim. The caliper comprises a stationary inner support, a movable intermediate support, and an outer support that is hinged relative to the inner support. Under action of the actuator, the movable intermediate support moves and causes the brake disk to move so that the brake disk is clamped between the intermediate support and the outer support, and then causes the outer support to tilt so that the brake disk is clamped between the inner support and the outer support.

20 Claims, 4 Drawing Sheets (58) Field of Classification Search
CPC .......... F16D 65/095; F16D 2055/0008; F16D 55/30; F16D 55/2245; F16D 55/226; B64C 25/44; B64C 25/42; B60T 1/062; B60T 8/1703; B60T 8/325
See application file for complete search history.

(56) References Cited

U.S. PATENT DOCUMENTS

| | | | | |
|---|---|---|---|---|
| 2,778,452 A * | 1/1957 | Dasse | ............. | F16D 55/40 188/71.5 |
| 2,827,132 A * | 3/1958 | Buyze | ............. | F16D 55/2245 188/72.5 |
| 2,983,337 A * | 5/1961 | Butler | ............. | F16D 55/2255 188/71.6 |
| 3,016,111 A | 1/1962 | Lucien et al. | | |
| 3,164,223 A * | 1/1965 | Kemp | ............. | F16D 55/40 188/17 |
| 3,318,420 A * | 5/1967 | Adams | ............. | F16D 55/2245 188/72.2 |
| 3,465,849 A * | 9/1969 | Bernfeld | ............. | F16D 65/46 188/71.9 |
| 3,519,107 A * | 7/1970 | Bellinger | ............. | B61K 7/08 188/62 |
| 3,525,421 A * | 8/1970 | Van Sickle | ............. | F16D 55/32 188/71.5 |
| 3,559,773 A * | 2/1971 | Hock | ............. | F16D 59/00 188/187 |
| 3,845,919 A * | 11/1974 | Jenny | ............. | B64C 25/34 244/103 R |
| 4,007,927 A * | 2/1977 | Proctor | ............. | A63B 21/015 482/63 |
| 4,181,199 A * | 1/1980 | Flotow | ............. | F16D 55/224 188/72.9 |
| 4,374,552 A * | 2/1983 | Dayen | ............. | F16D 55/2245 188/72.9 |
| 4,697,671 A * | 10/1987 | Stewart | ............. | F16D 55/2245 188/250 G |
| 4,821,846 A * | 4/1989 | Adleff | ............. | B61H 5/00 188/369 |
| 5,660,250 A * | 8/1997 | Treude | ............. | F16D 55/2245 188/72.9 |
| 5,921,354 A * | 7/1999 | Evans | ............. | F16D 55/2245 188/72.2 |
| 6,003,640 A * | 12/1999 | Ralea | ............. | B60T 8/1703 188/1.11 L |
| 6,305,506 B1 * | 10/2001 | Shirai | ............. | B60T 7/042 188/136 |
| 6,581,730 B1 * | 6/2003 | Haydon | ............. | B60T 1/065 188/18 A |
| 7,316,301 B2 | 1/2008 | Roberts | | |
| 2014/0367209 A1 | 12/2014 | Delayre et al. | | |
| 2015/0122593 A1* | 5/2015 | Drennen | ............. | B60T 13/741 188/71.5 |
| 2015/0266568 A1 | 9/2015 | Evenor et al. | | |
| 2015/0337915 A1* | 11/2015 | Chambard | ............. | B64C 25/44 188/71.5 |

FOREIGN PATENT DOCUMENTS

| | | |
|---|---|---|
| FR | 3007096 A1 | 12/2014 |
| FR | 3018880 A1 | 9/2015 |

\* cited by examiner

CALIPER BRAKING SYSTEM FOR AIRCRAFT LANDING GEAR HAVING A PLURALITY OF BRAKE DISK CLAMPING ZONES

CROSS-REFERENCE TO RELATED APPLICATION'S

This application claims priority to French patent application No. FR 1800600 filed on Jun. 12, 2018, the disclosure of which is incorporated in its entirety by reference herein.

BACKGROUND OF THE INVENTION

(1) Field of the Invention

The present invention relates to a caliper braking system for wheeled aircraft landing gear, the system having a plurality of brake disk clamping zones, and the invention also relates to wheeled landing gear including such a braking system and to an aircraft including such a braking system.

(2) Description of Related Art

A known braking system for aircraft comprises at least one brake and a brake disk floatingly mounted relative to a rim carrying a tire. Each brake is configured to brake the brake disk and consequently the rim. Conventionally, a brake comprises an actuator acting on brake pads in order to clamp the brake disk by means of said brake pads. The actuator is generally hydraulic.

The term "brake disk floatingly mounted relative to the rim" is used to designate a brake disk that is movable relative to the rim so as to enable the brake disk to perform movements of small amplitudes relative to the rim in order to avoid transmitting excessive mechanical stresses between the brake disk and the rim. Nevertheless, the brake disk includes constraining elements that co-operate with the rim so as to ensure the rim and the disk are still connected together in rotation.

Furthermore, a braking system for wheeled aircraft landing gear may include a plurality of actuators, e.g. four or six actuators, that, are distributed in regular manner around the axis of rotation of the landing gear wheel. Such a braking system thus acts in substantially uniform manner on the brake disk under the actions of the brake actuators while braking.

A braking system for wheeled aircraft landing gear may equally well comprise a single brake, as described in Document PR 3 007 096. Such a brake has a single actuator acting on a caliper provided with a stationary jaw and a movable jaw carrying respective brake pads. While braking, such a braking system then acts asymmetrically on the brake disk under the action of the actuator. Furthermore, the force needed for braking is supplied by a single actuator, which therefore needs to be dimensioned accordingly, and which can be difficult to install in the aircraft landing gear.

Document FR 3 018 380 discloses an electromechanical actuator that is usable in such a braking system.

In addition, a brake disk for aircraft landing gear is generally provided with a braking track carrying first teeth that form tenons. The first teeth are distributed circumferentially relative to a circle centered on a central axis of the brake disk, each first tooth extending radially relative to the central axis. Each first tooth extends circumferentially between two facets.

The rim is also provided with second teeth, two edges of two adjacent second teeth circumferentially defining a notch forming a mortise suitable for receiving a tenon of the brake disk.

Under such circumstances, each first tooth is positioned in a notch, the two facets of a first tooth facing two edges of two different second teeth. Each first tooth is thus arranged circumferentially between two edges of two second teeth. Two functional gaps thus lie circumferentially between the facets of a first tooth of the disk and two corresponding second edges of the rim. As a result, the first teeth of the brake disk constitute elements for constraining the brake disk to rotate with the rim about the axis of rotation of the rim.

In addition, each second tooth may carry two clips adjacent to its edges. Such clips may be attached to the rim by screws or rivets. Likewise, at least one clip may be fastened to each first tooth.

In addition, a brake wire may be fastened to the rim so as to prevent a first tooth leaving a notch axially.

Such a brake disk is sometimes used within a braking system having a single brake or else a plurality of brakes that are not regularly distributed around the axis of rotation of the wheel. During braking, the two facets of a first tooth of the brake disk may then be subjected to forces in alternation. This can give rise to pulsed forces being applied to the rim and to any running gear mounted on the rim. In addition, the brake disk can oscillate in the rim and can generate vibration in the brake(s).

These phenomena tend to contribute to premature wear of the interface between the brake and the rim and/or to the appearance of vibration that is audible, and/or to fatigue stresses.

The prior art of the invention includes Document U.S. Pat. No. 3,016,111, which describes a brake caliper having a stationary support for a first friction pad and a movable support for a second friction pad. The movable support is hinged by means of two links in order to hold the second friction pad substantially parallel to the brake disk.

Document U.S. Pat. No. 2,586,518 describes a mechanical braking device positioned inside an aircraft wheel and comprising a stationary plate and a plate that is movable along the axis of the wheel. Those two plates serve to clamp a disk that is constrained to the wheel and thereby brake rotation of the wheel.

Document EP 3 181 935 describes a braking device having a caliper carrying two tilting pads situated on either side of the brake disk. Each pad has a first end that is mounted to pivot relative to the caliper and the brake disk, and a second end that is moved in translation by a screw-and-nut system so as to cause these second pad ends to move towards each other or apart from each other, thereby clamping or releasing the brake disk.

Furthermore, the technological background of the invention includes Document U.S. Pat. No. 7,316,301, which discloses a brake caliper.

BRIEF SUMMARY OF THE INVENTION

An object of the present invention is to propose a braking system serving to obviate the above-mentioned limitations by using a plurality of clamping zones between a brake disk and a caliper, firstly in order to amplify the braking force generated by an actuator so as to limit the dimensions of the actuator, and secondly so as to distribute the braking forces substantially uniformly over the brake disk in order to optimize the operation and the lifetime of the braking system.

The present invention thus provider, a caliper braking system for wheeled aircraft landing gear, the system having a plurality of zones for clamping the brake disk, and the invention also provides landing gear including such a braking system, and an aircraft including such a braking system.

According to the invention, a braking system for wheeled aircraft landing gear comprises:

at least one actuator;

at least one caliper provided with a plurality of supports, each support including at least one pad;

a rim movable in rotation about an axis of rotation AXROT1; and a brake disk floatingly mounted relative to the rim, the brake disk including constraining elements that co-operate with notches in the rim.

The braking system of the invention is intended in particular for the wheeled landing gear of rotary wing aircraft. Each wheel of such landing gear comprises a rim and a tire that are constrained to each other.

This braking system is remarkable in that said at least one caliper comprises a stationary inner support, a movable intermediate support that is movable under the action of an actuator, and an outer support hinged relative to the stationary inner support, the brake disk being arranged firstly between the intermediate support and the outer support, and secondly between the inner support and the outer support, at least one pad being positioned between each support and the brake disk, such that under action of the actuator, the movable intermediate support moves and begins by causing a first movement of the brake disk so that the brake disk is clamped by means of the pads between the intermediate support and the outer support, and then continues to cause a second movement of the outer support 30 that the brake disk is clamped by means of the pads between the inner support and the outer support.

By way of example, the actuator may be a linear actuator, such as an electrical, electromechanical, or indeed hydraulic actuator that causes the intermediate support to move along a clamping direction DIR1. The clamping direction DIR1 is substantially parallel to the axis of rotation AXROT1 of the rim.

The outer support is hinged relative to the inner support about a pivot axis AXROT2 so that the braking system includes at least one zone for clamping the brake disk on either side of the pivot axis AXROT2. Preferably, the pivot axis AXROT2 is arranged substantially perpendicularly to a plane containing the clamping direction DIR1 and the axis of rotation AXROT1 of the rim.

As a result, a caliper has a plurality of clamping zones for clamping the brake disks, two supports situated on either side of the brake disk including one pad per clamping zone, for example. The intermediate support thus co-operates with the outer support in order to form a first zone for clamping the brake disk while the inner support co-operates with the outer support in order to form at least one second clamping zone, and possibly a plurality of clamping zones for clamping the brake disk.

For this purpose, the intermediate support is preferably provided with a single pad, while the inner support is provided with at least one pad and the outer support is provided with at least two pads. The brake disk is thus clamped following action of the actuator, firstly between the pad of the intermediate support and one pad of the outer support, and secondly between at least one pad of the inner support and at least one pad of the outer support.

In a first embodiment, a braking system has two zones for clamping the brake disk and a caliper that is provided with an inner support having a single pad, an intermediate support having a single pad, and an outer support having two pads.

In a second embodiment, a braking system has three clamping zones and a caliper chat is provided with an inner support having two pads, an intermediate support having a single pad, and an outer support having three pads.

As a result, during action of the actuator, the intermediate support moves parallel to the clamping direction DIR1. First contact between the brake disk and the pad of the intermediate support then takes place. The Intermediate support continues to move parallel to the clamping direction DIR1 under action of the actuator, thereby giving rise to a first movement and/or a first deformation of the brake disk by means of the intermediate support. Second contact then takes place between the brake disk and the pad of the outer support.

The intermediate support continues to move parallel to the clamping direction DIR1 under action from the actuator, thereby giving rise to the first movement and/or the first deformation of the brake disk and to pivoting of the outer support about the pivot axis AXROT2. Third contact then takes place between the brake disk and at least one pad of the outer support. The intermediate support continues to move parallel to the clamping direction DIR1 under action from the actuator, thereby giving rise to the first movement and/or the first deformation of the brake disk, to pivoting of the outer support, and to a second movement and/or a second deformation of the brake disk by means of the outer support. Fourth contact then takes place between the brake disk and at least one pad of the inner support.

The brake disk is thus clamped by means of the pads firstly between the intermediate support and the outer support, and secondly between the inner support and the outer support. The braking system of the invention thus advantageously serves to multiply the number of brake disk clamping zones, while limiting the number of actuators that are needed.

The action of a single actuator thus enables a plurality of brake disk clamping zones to be obtained and serves advantageously to multiply the force that is generated by the actuator in order to obtain an amplified braking force. The force generated by the actuator, and consequently its dimensions, can therefore be limited compared with a prior art braking system, thereby making it easier to install in the aircraft landing gear.

Consequently, the braking system may have a single actuator and a single caliper while delivering a braking force that is large and sufficient.

The braking system may also include at least two actuators and at least two calipers, with each actuator co-operating with a single caliper, e.g. in order to reduce the dimensions of each actuator, as a function of the volume available for installing the actuator.

Furthermore, the presence of a plurality of clamping zones for the braking system of the invention serves advantageously to distribute the braking force over that plurality of clamping zones, preferably in uniform manner, thereby limiting or indeed avoiding the appearance of vibration and/or of pulsed forces in the braking system, or indeed limiting or avoiding any transmission thereof to the rim and to the running gear mounted on the rim. This serves to improve the operation and the lifetime of the braking system of the invention.

Furthermore, the pivot axis AXROT2 is preferably arranged so as to intersect the axis of rotation AXROT1 of the rim, and so as to be situated in a midplane P1 of the brake disk. The term "midplane P1" is used to mean a plane that is parallel to and equidistant from the outer faces of the brake disk that come into contact with the pads.

As a result, a substantially equal force is applied to the clamping zones on either side of the pivot axis AXROT2. By way of example, this force is substantially equal to the force from the actuator. Under such circumstances, the clamping zones of the braking system of the invention are preferably of identical dimensions. The clamping zones of the braking system of the invention are then distributed regularly and in substantially uniform manner relative to the pivot axis AXROT2.

Nevertheless, the pivot, axis AXROT2 may be offset from that position so as to obtain forces that differ depending on the positions of the clamping zones relative to the pivot axis AXROT2, in particular when the number of clamping zones on either side of the pivot axis AXROT2 are different or when the dimensions of the those clamping zones on either side of the pivot, axis AXROT2 are different. The clamping zones of the braking system of the invention are then distributed irregularly relative to the pivot axis AXROT2.

By way of example, the pivot axis AXPOT2 may be offset relative to the axis of rotation AXROT1 in a direction that is perpendicular to the axis of rotation AXROT1 and to the pivot axis AXROT2.

In another example, the pivot axis AXROT2 may be offset relative to the midplane P1 of the brake disk in a direction parallel to the axis of rotation AXROT1.

The pivot axis AXROT2 may equally well be offset simultaneously relative to the axis of rotation AXROT1 in a direction that is perpendicular to the axis of rotation AXROT1 and to the pivot axis AXROT2, and also relative to the midplane P1 of the brake disk in a direction parallel to the axis of rotation AXROT1.

The present invention also provides wheeled aircraft landing gear including at least one braking system as described above.

The present invention also provides an aircraft including wheeled landing gear having at least one braking system as described above.

BRIEF DESCRIPTION OF THE DRAWINGS

The invention and its advantages appear in greater detail from the context of the following description of examples given by way of illustration and with reference to the accompanying figures, in which.

DETAILED DESCRIPTION OF THE INVENTION

Elements present in more than one of the figures are given the same references in each of them.

Figure 1:
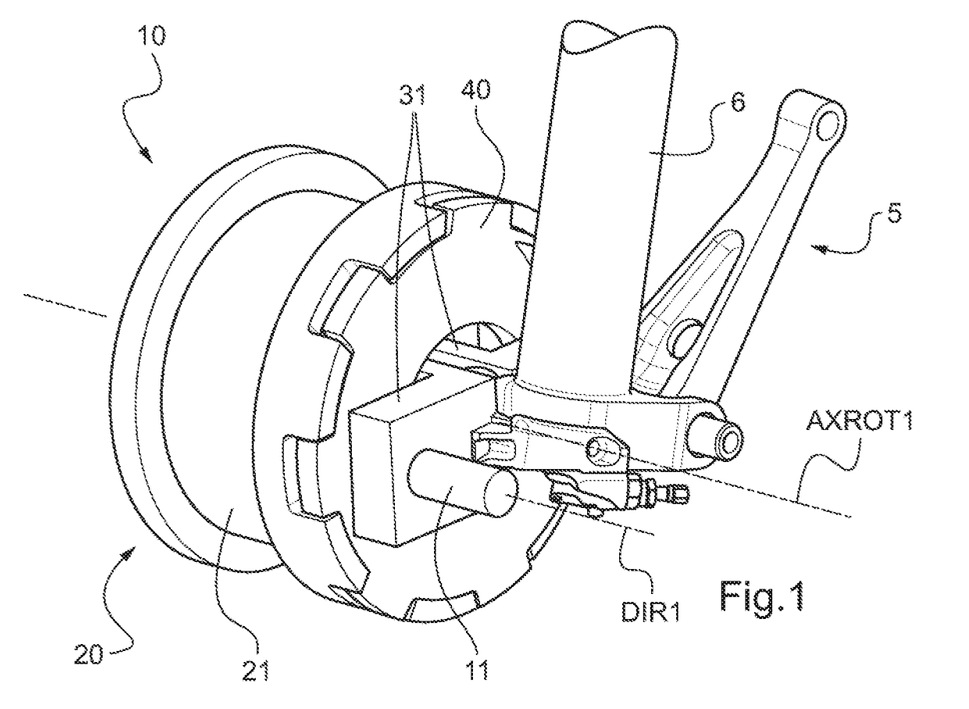
FIG. 1 is a view of aircraft landing gear having a braking system of the invention.

The aircraft may in particular include wheeled landing gear 5. The wheeled landing gear 5 possesses a landing gear leg 6 carrying both a wheel axle and a braking system 10.

The braking system 10 is provided with a rim 20 that is movable in rotation about an axis of rotation AXROT1, a brake disk 40 that co-operates with the rim 20, and also an actuator 11 with a caliper 12. Thus, during a braking action, the actuator 11 acts on the caliper 12 so as to clamp the brake disk 40 by means of pads 35, 36, 37 included in the caliper 12, so as to brake rotation of the brake disk 40, and consequently rotation of the rim 20.

Conventional bearing device may be arranged between the rim 20 and the wheel axle. In addition, the rim 20 carries a tire that is not shown for convenience. FIGS. 4 to 7 show embodiments of the braking system 10 in which the rim 20 is not shown for greater clarity.

Figure 2:
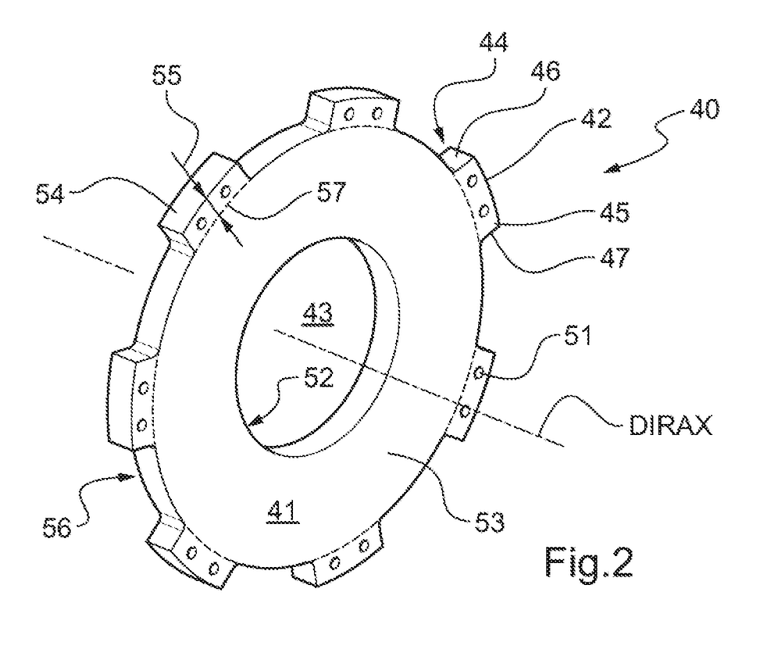
FIG. 2 is a view of a brake disk of such a braking system.

FIG. 2 shows a brake disk 40 of such a braking system 10 for an aircraft. The brake disk 40 has a hollow central portion 43 and a plurality of constraining elements 42 formed by first teeth that extend substantially radially outwards from the brake disk 40. The brake disk 40 is of constant thickness, extending front a first disk face 53 to a second disk face 56.

Figure 3:
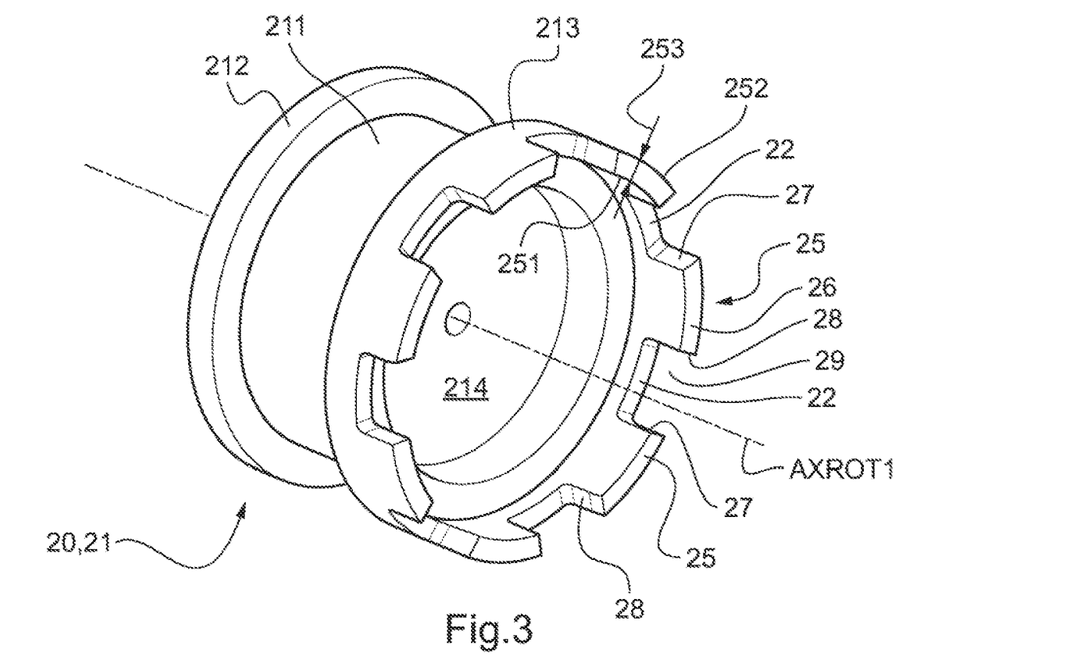
FIG. 3 is a view of a rim of such a braking system.

Furthermore, FIG. 3 shows a rim 20 of such a braking system 10. The rim 20 is provided with a rim body 21 suitable for carrying a tire and it includes notches 29 that are open towards the outside of the rim 20 and that are distributed circumferentially around the axis of rotation AXROT1 of the rim 20. Each notch 29 is defined by a wall that is substantially U-shaped.

The brake disk 40 is floatingly mounted relative to the rim 20, as shown in FIG. 1. Specifically, the brake disk 40 is movable relative to the rim 20 so as to allow it to perform movements of small amplitudes, with the constraining elements 42 of the brake disk 40 co-operating with the notches 29 of the rim 20 so that the rim 20 and the brake disk 40 are constrained to rotate together about the axis of rotation AXROT1. Consequently, the transmission of mechanical stresses between the brake disk 40 and the rim 20 is limited.

Figure 4:
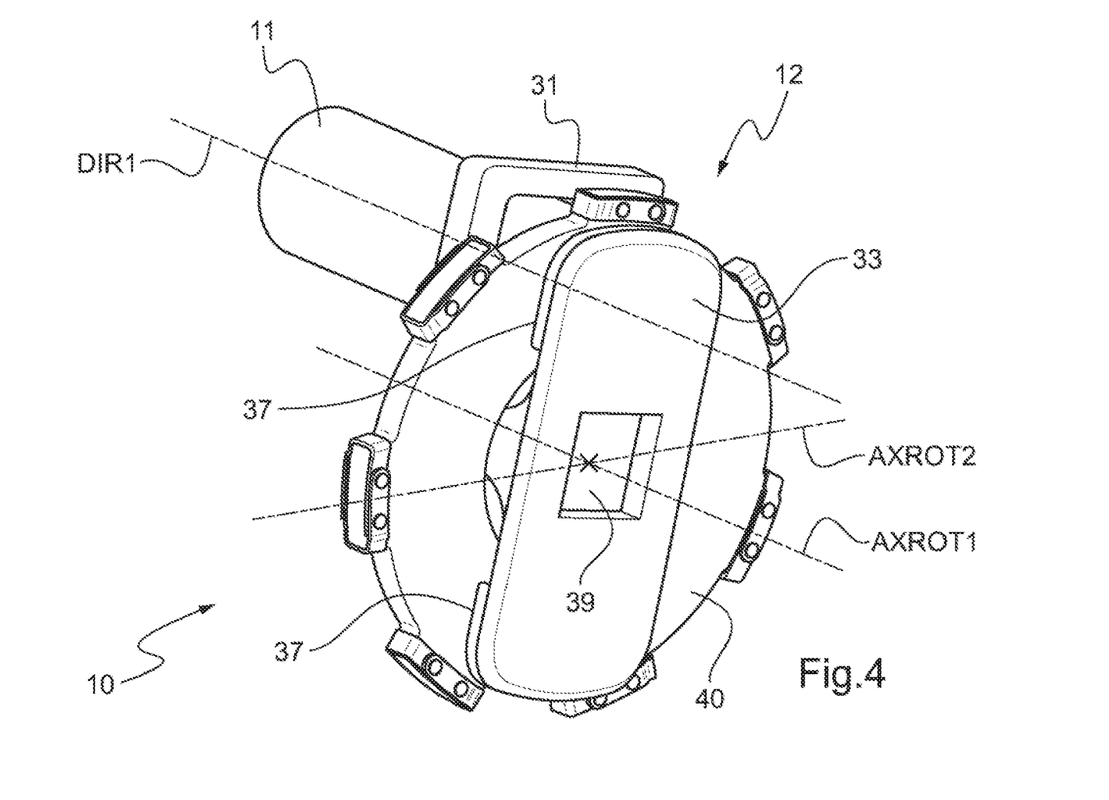
FIGS. 4 and 5 show a first embodiment of the braking system.
Figure 5:
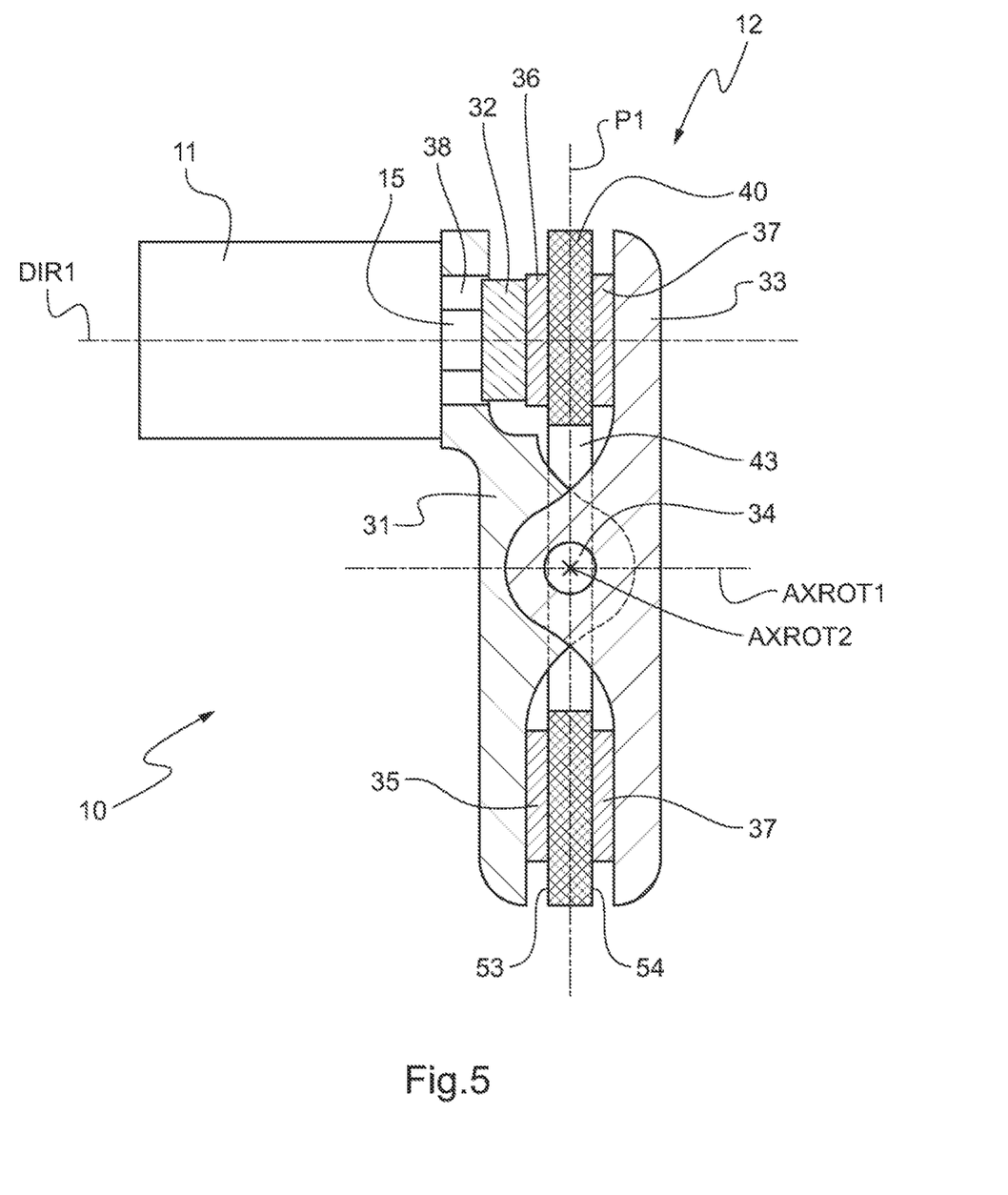

In FIGS. 4 to 7, the caliper 12 of the braking system 10 has a plurality of clamping zones for clamping the brake disk 40. A first embodiment of the braking system 1G, as shown in FIGS. 4 and 5, has two brake disk clamping zones, while second and third embodiments of the braking system 10 as shown respectively in FIGS. 6 and 7 have three brake disk clamping zones.

In a manner that is common to all of these embodiments, the caliper 12 has a stationary inner support 31, a movable intermediate support 32, and an outer support 33 that is hinged about a pivot axis AXROT2 to pivot relative to the stationary inner support 31. The brake disk 40 is arranged firstly between the intermediate support 23 and the outer support 33, and secondly between the inner support 31 and the outer support 33, as shown in FIGS. 4 to 7. Each support 31, 32, 33 has at least one pad 35, 36, 37 arranged so as to be positioned between a support 33, 32, 33 and the brake disk 40.

The actuator 11 is constrained to the stationary inner support 31. The actuator 11 is a linear actuator, such as an actuator that is electrical, electromechanical, or indeed hydraulic, and it includes a movable rod 15 suitable for moving in translation along a clamping direction DIR1. The clamping direction DIR1 is parallel to the axis of rotation AXROT1. The inner support 31 has a first passage 38 allowing the movable rod 15 of the actuator 11 to act directly on the intermediate support 32 causing it to move parallel to the clamping direction DIR1. Furthermore, the movable rod 15 and the intermediate support 32 may constitute a single part.

In addition, the braking system 10 includes at least one pivot pin 34 arranged along the pivot axis AXROT2 between the inner support 31 and the outer support 33 thus forming a pivot connection between the inner support 31 and the outer support 33. The inner support 31 and the outer support 33 are preferably connected together by a pivot pin 34 in the hollow central portion 43 of the brake disk 40, thereby advantageously limiting the overall size of the braking system 10. In addition, the inner support 31 and the outer support 33 include a second passage 39 on the axis of rotation AXROT1 serving in particular to pass the wheel axle that supports the rim 20.

Figure 6:
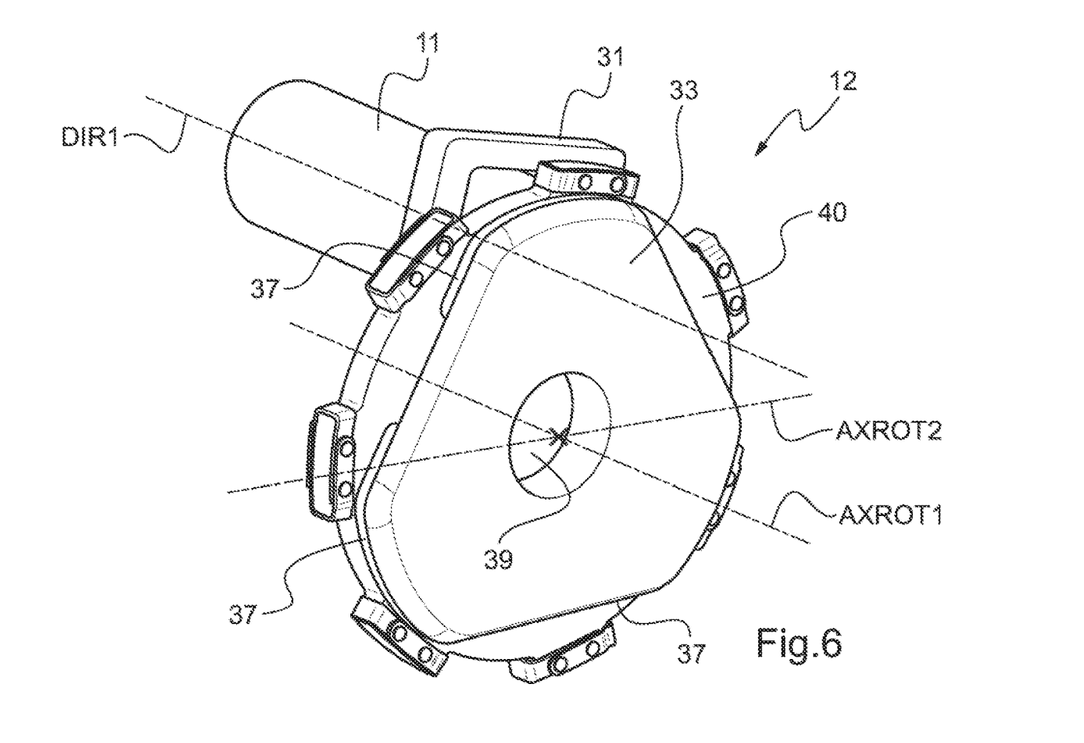
FIG. 6 shows a second embodiment of the braking system.

The pivot axis AXROT2 is arranged substantially perpendicularly to a plane containing the clamping direction DIR1 and the axis of rotation AXROT1 of the rim 20. In addition, in the first and second embodiments of the braking system 10, the pivot axis AXROT2 is arranged so as to intersect the axis of rotation AXROT1 and lies in a midplane P1 of the brake disk 40, the midplane P1 being parallel to and equidistant from the first disk face 53 and the second disk face 56 of the brake disk 40.

Figure 7:
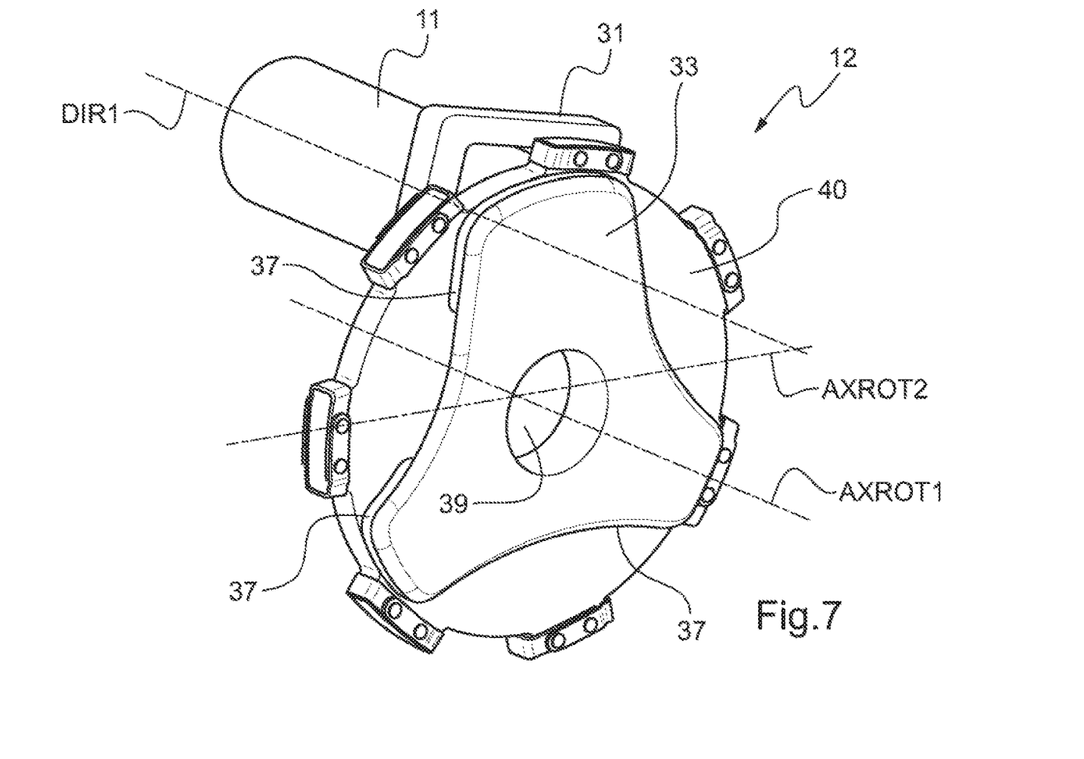
FIG. 7 shows a third embodiment of the braking system.

In the third embodiment of the braking system 10, the pivot axis AXROT2 is arranged so as to be offset firstly from the midplane P1 of the brake disk 40 parallel to the axis of rotation AXROT1, and secondly relative to the axis of rotation AXROT1 in a direction perpendicular to the axis of rotation AXROT1 and to the pivot axis AXROT2.

Advantageously, the caliper 12 of the braking system 10 thus includes at least one zone for clamping the brake disk 40 on either side of the pivot axis AXROT2. For each clamping zone, two supports 31, 32, 33 situated on either side of the brake disk 40 carry respective pads 35, 36, 37.

In the first embodiment, the intermediate support 32 co-operates with the outer support 33 to form a first zone for clamping the brake disk 40, while the inner support 31 co-operates with the outer support 33 to form a second clamping zone. The inner support 31 and the intermediate support 32 then carry respective single pads 35, 36, while the outer support 33 carries two pads 37. These two clamping zones may be of identical dimensions, as shown in FIG. 4.

In the second and third embodiments, the intermediate support 32 co-operates with the outer support 33 in order to form a first zone for clamping the brake disk 40, whereas the inner support 31 co-operates with the outer support 33 in order to form both a second clamping zone and a third clamping zone. The inner support 31 thus has two pads 35, the intermediate support 32 thus has a single pad 36, and the outer support 33 has three pads 37. In the second embodiment, these three clamping zones are of identical dimensions, as shown in FIG. 6, thereby serving to balance clamping of the brake disk and to obtain wear that is substantially uniform. In the third embodiment, the second and third clamping zones are of smaller dimensions than the first clamping zone, as shown in FIG. 7, thus serving to compensate for the pivot axis AXROT2 being offset relative to the midplane P1 of the brake disk 40 and relative to the axis for rotation AXROT1, thereby balancing clamping of the brake disk in spite of the offset.

In these second and third embodiments, the clamping zones of the braking system 10 are angularly distributed in regular manner around the axis of rotation AXROT1. Nevertheless, the angular distribution of the clamping zones of the braking system 10 about the axis of rotation AXROT1 could be irregular, regardless of whether the clamping zones are of dimensions that are identical or different, without degrading the operation and the advantages of this braking system 10.

During a braking action of the braking system 10, the actuator 11 generates movement along the clamping direction DIR1 of the movable rod 15, thereby moving the intermediate support 32 parallel to the clamping direction DIR1. The pad 36 on the intermediate support 32 is then touching the brake disk 40. The intermediate support 32 then continues to move parallel to the clamping direction DIR1 under the action of the actuator 11, leading to a first movement and/or a first deformation of the brake-disk 40 driven by the pad 36 on the intermediate support 32. The pad 37 of the outer support 33 then touches the brake disk 40, the brake disk 40 thus being clamped between the pads 36 and 37 of the intermediate support 32 and of the outer support 33.

The intermediate support 32 continues to move parallel to the clamping direction DIR1 under the action of the actuator 11, thereby causing the first movement and/or the first deformation of the brake disk 40 and also pivoting of the outer support 33 about the pivot axis AXROT2 relative to the stationary inner support 31. At least one pad 37 of the outer support 33 then touches the brake disk 40. The intermediate support 32 continues to move parallel to the clamping direction DIR1 under the action of the actuator 11, thereby giving rise to the first movement and/or the first deformation of the brake disk 40, to pivoting of the outer support 33, and to a second movement and/or a second deformation of the brake disk 40 driven by the outer support 33. At least one pad 35 of the inner support 31 then touches the brake 40, so that the brake disk 40 is thus clamped between the pads 35, 37 of the inner support 31 and of the outer support 33.

The brake disk is thus clamped over a plurality of clamping zones by means of the pads 35, 36, 37, firstly between the intermediate support 32 and the outer support 33, and secondly between the inner support 31 and the outer support 33. The force generated by the actuator 11 can thus advantageously be multiplied in order to obtain an amplified braking force.

Preferably, the braking system 10 may include a single actuator 11 and a single caliper 12, as shown in FIGS. 4 to 7, while still delivering a braking force that Is large and sufficient.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A braking system for a wheeled aircraft landing gear, the braking system comprising:
   at least one actuator;
   at least one caliper provided with a plurality of supports, each support including at least one pad;
   a rim movable in rotation about an axis of rotation; and
   a brake disk floatingly mounted relative to the rim, the brake disk including constraining elements that co-operate with notches in the rim;
   wherein the plurality of supports of the at least one caliper comprises a stationary inner support, a movable intermediate support that is movable under the action of the at least one actuator, and an outer support hinged relative to the inner support, the brake disk being arranged firstly between the intermediate support and the outer support, and secondly between the inner support and the outer support, the at least one pad being positioned between each support and the brake disk, such that under action of the at least one actuator, the movable intermediate support moves causing a first movement of the brake disk so that the brake disk is clamped by the at least one pad between the intermediate support and the outer support, and then continues to move the outer support so that the brake disk is clamped by the at least one pad between the inner support and the outer support.

2. The braking system according to claim 1, wherein the at least one actuator comprises only a single actuator and the at least one caliper comprises only a single caliper such that the braking system comprises the single actuator and the single caliper.

3. The braking system according to claim 1, wherein the at least one actuator comprises at least two actuators and the at least one caliper comprises at least two calipers such that the braking system comprises the at least two actuators and the at least two calipers, with each actuator co-operating with a single one of the at least two calipers.

4. The braking system according to claim 1, wherein the at least one pad comprises a plurality of pads, the stationary inner support is provided with at least one pad of the plurality of pads, the movable intermediate support is provided with at least one pad of the plurality of pads, and the outer support provided with at least two pads of the plurality of pads, the brake disk being clamped following an action of the at least one actuator, firstly between the pad of the intermediate support and one pad of the outer support, and secondly between the at least one pad of the inner support and at least one pad of the outer support.

5. The braking system according to claim 1, wherein the at least one pad comprises a plurality of pads, wherein the stationary inner support is provided with a first pad of the plurality of pads, the intermediate support is provided with a second pad of the plurality of pads, and the outer support is provided with two pads of the plurality of pads.

6. The braking system according to claim 1, wherein the at least one pad comprises a plurality of pads, wherein the stationary inner support is provided with two pads of the plurality of pads, the intermediate support is provided with one pad of the plurality of pads, and the outer support is provided with three pads of the plurality of pads.

7. The braking system according to claim 1, wherein the outer support is hinged relative to the inner support about a pivot axis arranged perpendicularly to a plane containing the axis of rotation of the rim and a clamping direction corresponding to a movement direction of the intermediate support under action of the at least one actuator.

8. The braking system according to claim 7, wherein the pivot axis is arranged so as to intersect the axis of rotation of the rim and is situated in a midplane of the brake disk.

9. The braking system according to claim 7, wherein the pivot axis is offset relative to the axis of rotation of the rim in a direction perpendicular to the axis of rotation of the rim and to the pivot axis.

10. The braking system according to claim 7, wherein the pivot axis is offset relative to a midplane of the brake disk in a direction parallel to the axis of rotation of the rim.

11. A wheeled landing gear, wherein the wheeled landing gear includes at least one braking system according to claim 1.

12. An aircraft including a wheeled landing gear and wherein the wheeled landing gear includes at least one braking system according to claim 1.

13. A wheeled landing gear, wherein the wheeled landing gear includes a braking system comprising:
   an actuator;
   a caliper having a plurality of supports, each support having at least one pad;
   a rim movable in rotation about an axis of rotation; and
   a brake disk floatingly mounted relative to the rim, the brake disk including at least one constraining element co-operable with notches in the rim;
   the plurality of supports comprising a stationary inner support, a movable intermediate support that is movable under the action of the actuator, and an outer support hinged relative to the inner support, the brake disk arranged between the intermediate support and the outer support, and the brake disk arranged between the inner support and the outer support, the at least one pad disposed between each support and the brake disk, such that under action of the actuator, the movable intermediate support moves causing movement of the brake disk so that the brake disk is clamped by the at least one pad between the intermediate support and the outer support, and also causes movement of the outer support so that the brake disk is clamped by the at least one pad between the inner support and the outer support.

14. The wheeled landing gear according to claim 13, wherein the at least one pad comprises a plurality of pads, the stationary inner support has at least one pad of the plurality of pads, the movable intermediate support has at least one pad of the plurality of pads, and the outer support has at least one pad of the plurality of pads, the brake disk being clamped, following action of the actuator, between the pad of the intermediate support and the at least one pad of the outer support, and between the at least one pad of the inner support and the at least one pad of the outer support.

15. The wheeled landing gear according to claim 13, wherein the braking system further comprises a second actuator and a second caliper such that the braking system comprises two actuators and two calipers, with each actuator co-operable with a single one of the two calipers.

16. The wheeled landing gear according to claim 14, wherein the outer support is hinged relative to the inner support about a pivot axis arranged perpendicularly to a plane containing the axis of rotation of the rim and a clamping direction corresponding to a movement direction of the intermediate support under action of the actuator.

17. The wheeled landing gear according to claim 16, wherein the pivot axis is arranged so as to intersect the axis of rotation of the rim and is situated in a midplane of the brake disk.

18. The wheeled landing gear according to claim 16, wherein the pivot axis is offset relative to the axis of rotation of the rim in a direction perpendicular to the axis of rotation of the rim and to the pivot axis.

19. The wheeled landing gear according to claim 16, wherein the pivot axis is offset relative to a midplane of the brake disk in a direction parallel to the axis of rotation of the rim.

20. An aircraft including a wheeled landing gear and wherein the wheeled landing gear includes a braking system comprising:
   an actuator;
   a caliper provided with a plurality of supports, each support including at least one pad;
   a rim movable in rotation about an axis of rotation; and a brake disk mounted relative to the rim, the brake disk including constraining elements co-operable with notches in the rim;

the plurality of supports of the at least one caliper comprising a stationary inner support, a movable intermediate support movable in response to action of the actuator, and an outer support hinged relative to the inner support, the brake disk disposed between the intermediate support and the outer support, and between the inner support and the outer support, the at least one pad being positioned between each support and the brake disk, such that under action of the actuator, the movable intermediate support moves causing a first movement of the brake disk so that the brake disk is clamped by the at least one pad between the intermediate support and the outer support, and then continues to move the outer support so that the brake disk is clamped by the at least one pad between the inner support and the outer support.

* * * * *